United States Patent [19]

Lalancette et al.

[11] Patent Number: 4,495,223
[45] Date of Patent: Jan. 22, 1985

[54] PROCESS FOR PHOSPHATING ASBESTOS FIBERS

[75] Inventors: Jean-Marc Lalancette; Marcel Cossette; Pierre Delvaux, all of Sherbrooke, Canada

[73] Assignee: Societe Nationale de L'Amiante, Quebec, Canada

[21] Appl. No.: 582,474

[22] Filed: Feb. 22, 1984

[51] Int. Cl.³ .................. B05D 7/00; C03B 37/00; C23C 11/00; C23C 13/00
[52] U.S. Cl. .................................... 427/215; 106/306; 162/3; 162/80; 162/153; 423/167; 427/255; 428/443; 501/95
[58] Field of Search ............... 427/215, 255; 428/443; 106/306; 162/3, 80, 153; 423/167; 501/95

[56] References Cited
U.S. PATENT DOCUMENTS
4,356,057 10/1982 Lalancette et al. ............ 428/443 X Primary Examiner—Michael R. Lusignan
Attorney, Agent, or Firm—Cushman, Darby & Cushman

[57] ABSTRACT

There is disclosed an improved process for phosphating asbestos fibers by reacting phosphorus chlorides with asbestos fibers in a first reaction vessel heated to a temperature within the range of the boiling temperature of the selected phosphorus chloride at atmospheric pressure and 200° C. above the boiling temperature of said phosphorus chloride, then the phosphated asbestos fibers are cured in a second chamber and purged of any volatile by-product formed during the phosphating step. The products obtained possess reduced haemolytic activity.

6 Claims, 1 Drawing Figure

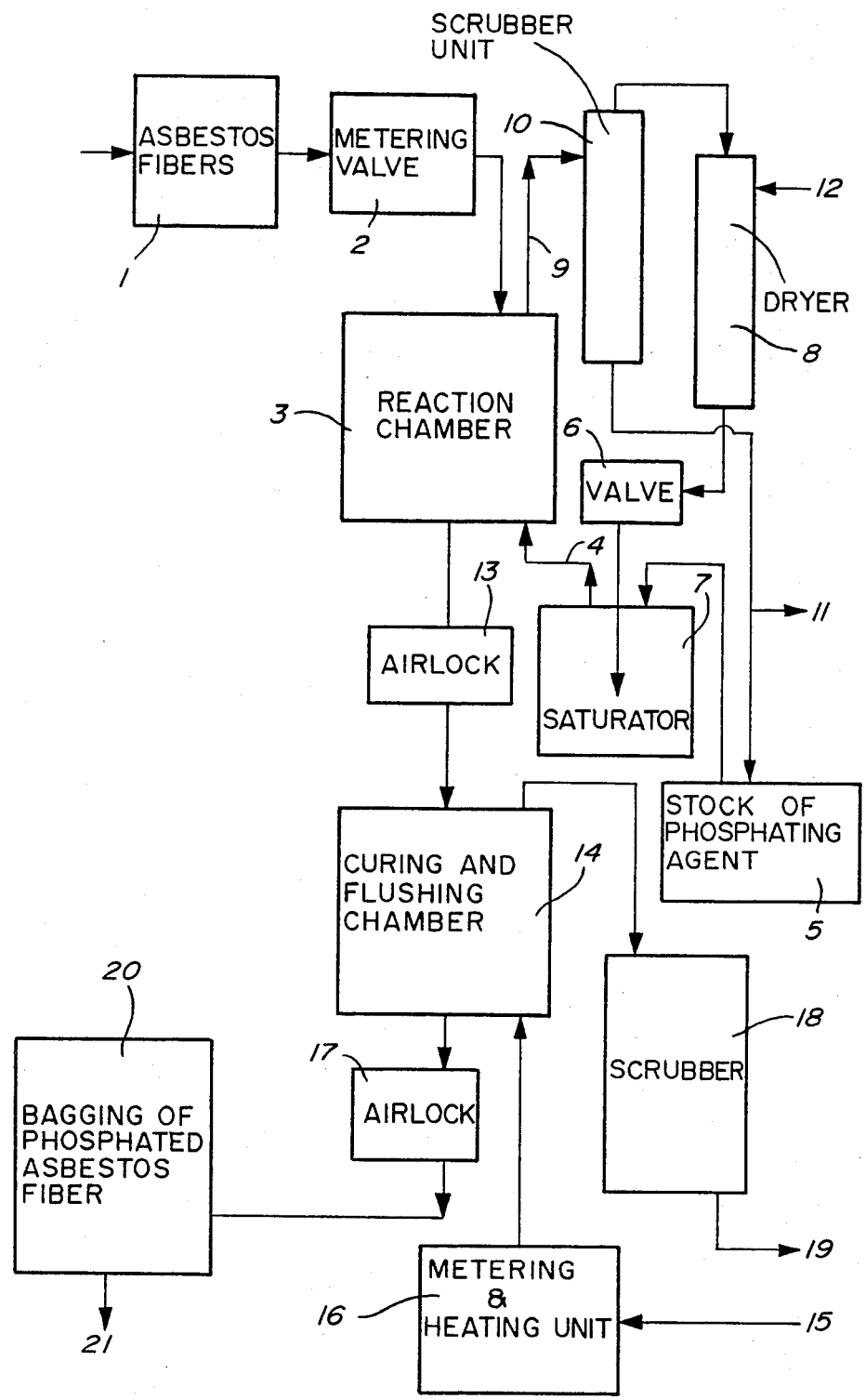

PROCESS FOR PHOSPHATING ASBESTOS FIBERS

BACKGROUND OF THE INVENTION

It is known that treatment of chrysotile asbestos with phosphorus oxychloride leads to the reduction of physiological activity of the treated fibers (U.S. Pat. No. 4,356,057 Lalancette et al.). In this patent little consideration is given to the recovery of the gaseous phosphorus compounds nor to the obtaining of maximum yield. It is an object of the present invention to provide an improved phosphating process whereby the reaction of the phosphating gas is substantially complete and whereby any unreacted phosphating gas is readily recovered.

SUMMARY OF THE INVENTION

In accordance with the present invention there is provided an improved process for phosphating asbestos fibers whereby the drawbacks of the prior art phosphating procedure are eliminated.

The term "asbestos fiber" whenever used herein is intended to include the chrysotile, amosite and crocidolite varieties of commercial asbestos fibers.

Essentially, the improved process of the present invention comprises phosphating the asbestos fibers in a first reaction vessel under specific conditions and transferring the phosphated asbestos fibers to a second chamber in order to cure the phosphated asbestos and removing therefrom any unreacted phosphorus chloride, volatile and toxic by-products formed during the phosphating step.

More specifically, the improved process of the present invention comprises countercurrently circulating a gaseous phosphorus chloride in a first reaction chamber at near atmospheric pressure through a mass of substantially water-free asbestos fibers having a loose density of between 15 and 325 kg/m$^3$ and causing the gaseous phosphorus chloride to be adsorbed by said fibers whereby said asbestos fibers are caused to react with the gaseous phosphorus chloride. The adsorption of the gaseous phosphorus chloride and asbestos fibers is carried out at a temperature in a range between the boiling temperature of the phosphorus chloride at atmospheric pressure and 200° C. above the boiling temperature of the phosphorus chloride for a period of time varying between 0.2 and 4 hours whereby phosphated fibers are obtained. The thus phosphated asbestos fibers are then transferred to a second chamber to cure same for a period of from 0.1 to 6 hours at a temperature ranging from the boiling point of the selected phosphorus chloride and 240° C. above the boiling point of said phosphorus chloride. Once the curing step completed the phosphated asbestos fibers are freed of any unreacted phosphorus chloride, and volatile by-products formed during the phosphating step.

The phosphated asbestos fibers obtained in accordance with the present invention possess the same physical and reduced hemolytic characteristics as the phosphated fibers prepared in accordance with U.S. Pat. No. 4,356,057.

DETAILED DESCRIPTION OF THE INVENTION

The phosphorus chlorides which are used as phosphating agent in the present invention are the phosphorus trichloride, phosphorus pentachloride and phosphorus oxychloride. Accordingly, whenever the expression 'phosphorus chloride' is used it is intended to include said three phosphorus chlorides.

PHOSPHATING STEP

The asbestos fibers to be phosphated are heated previously to their entry in the first reaction chamber so as to eliminate as much water as possible. The preheating is preferably carried out at a temperature which corresponds to that in the first reaction chamber. Once the preheated, substantially water-free asbestos fibers are introduced in the reaction chamber they are cause to advance by a tumbling action in countercurrent with a gaseous phosphorus chloride supplied to the reaction chamber by means of a carrier gas such as dry air or dry nitrogen. The amount of water in the asbestos fibers introduced in the first reaction chamber should be less than 2% by weight.

The temperature of the first reaction chamber is maintained between the boiling temperature of the selected phosphorus chloride at atmospheric pressure and 200° C. above said boiling temperature.

The speed of movement of the asbestos fibers and of the selected phosphorus chloride is adjusted so that the contact time between the two varies from 0.5 to 8 hours with a preferred residence time of about 1 hour.

The amount of phosphorus chloride used in the phosphated step is slightly in excess of the required amount for phosphating purposes. A large excess of phosphorus chloride should be avoided for many reasons. First, an excessive amount of phosphorus chloride would tend to agglomerate the asbestos fibers together, thus reducing the technical properties of the fibers such as freeness. Secondly, the use of an excess of phosphorus chloride will increase the cost of the phosphated asbestos fibers. Accordingly, the amount of phosphorus chloride should slightly in excess of the amount required for passivation. It should also be appreciated that phosphorus chlorides are toxic and difficult to handle and thus it is highly advantageous to make as complete a use of the selected phosphorus chloride as possible thereby reducing to a minimum the recycling or destructive scrubbing of any unreacted phosphorus chloride.

The first reaction chamber is a closed elongated chamber provided with an inlet at one end for the asbestos fibers and an inlet at the opposite end for the selected gaseous phosphorus chloride. The chamber is also equipped internally with means for causing movement of the asbestos fibers from their entrance to their exit. The means can comprise any of the well known means secured to the internal walls of the reaction chamber or to a central rotating shaft such as vanes or the like.

An important feature of the improved process of the present invention is that the asbestos fibers move countercurrently to the direction of the gaseous phosphorus chloride thereby providing for a nearly complete use of the phosphorus chloride in one pass if the rates of addition of each component are properly adjusted and if the geometry of the reactor allows for the appropriate reaction time referred to previously.

The operating temperature within the first reaction chamber is between the boiling point of the selected phosphorus chloride and 200° C. above said boiling point whereby condensation of the selected phosphorus chloride in liquid form will be avoided thus providing for the maximum absorption of a film on the surface of the fibers that enhances the diffusion of the gaseous phosphating agent throughout the mass of fibers. The advantage of using substantially water-free asbestos fibers can easily be understood when it is appreciated that phosphorus halides are very easily hydrolyzed. Some moisture can be tolerated, but it should be so low, preferably below 2%, to avoid that the hydrolysis will predominate over the reaction of the phosphorus halides with the fibers and thus decrease the efficiency of the phosphating step and accordingly allow the phosphating agent to diffuse inside the bundle of fibers.

It will be appreciated that the improved process of the present invention favours the phosphation of the asbestos fibers through the mass of bundles of fibers. If treatment is limited only to the surface of the bundles, subsequent mechanical opening of the bundles will release fibrils which have not been phosphated and thus said fibrils will retain their undesirable physiological activity. It is known that commercial grades of asbestos fibers are made of bundles which contain millions of monofibers or fibrils which are released upon abrasion or impact. It is because of the particular structure of asbestos fibers that it is of the utmost importance that the phosphation is carried out throughout the mass of the fiber bundles. This explain why it is essential to start with asbestos fibers which have the lowest water content possible thereby avoiding any condensation of the phosphorus chloride in liquid form on the surface of the bundles. The formation of liquid, besides obstructing the pores on the surface of the bundles, contributes to slow the diffusion of the gaseous phosphorus chloride because of the superficial forces involved whereas the same gas will diffuse more readily through the interstices between monofibers than a liquid would.

It is noted that carrying out the phosphating step with the temperature range provided by the present invention provides the advantage of reducing the phosphating time and reducing the hemolytic activity of the phosphated asbestos fibers when compared to carrying out the phosphating step at a lower temperature allowing condensation of the selected phosphorus chloride. This feature is illustrated in Table I which shows the effect of adsorption on the reduction of hemolytic properties of 4T-30 asbestos fibers phosphated with phosphorus oxychloride which has a boiling point of 105° C.

TABLE I

Effect of the temperature of adsorption on the reduction of hemolytic properties of 4T-30 asbestos fibers phosphated with phosphorus oxychloride (b.p. 105° C.)

| TEMPERATURE OF PHOSPHATION (°C.) | DURATION (Hours) | P. ADSORBED (%) | HEMOLYSIS Phosphated fibers (%) | Reference (%) |
|---|---|---|---|---|
| 25 | 48 | 1.35 | 79 | 4.0 |
| 180 | 0.75 | 0.66 | 9.4 | 4.0 |
| 180 | 2.00 | 1.00 | 7.2 | 4.0 |

The hemolysis was determined by the manner described in U.S. Pat. No. 4,356,057 and is a measure of the damage done to cells by a foreign body. This measurement is made in comparison with a reference product which is known for its low level of action on said cells, for example, $TiO_2$. All substance have an hemolytic action. A value below 10% is considered very low. Values above 50% are indicative of a very high level of potency.

Temperatures slightly above dew point of phosphating agents are therefore required for maximum diffusion through the mass of fibrils. It has been found however that such temperatures, although appropriate for diffusion, are rather slow in terms of promoting the reaction of asbestos fibrils with the adsorbed phosphating agent.

CURING AND FLUSHING STEPS

Once the phosphated asbestos fibers are obtained in the first reaction chamber they are transferred to a second chamber for curing and flushing purposes.

The curing in the second chamber is carried out for a period of from 0.1 to 6 hours, preferably between 1 and 2 hours at a temperature ranging from the boiling point of the phosphorus chloride selected in the phosphating step and 240° C. above said boiling point. The increase of temperature favours the completion of the reaction.

Since during the phosphation step and the curing step there will be formed hydrogen chloride and possibly other acidic materials and there is a possibility that some unreacted phosphating agent will remain in the phosphated asbestos fibers it is important to remove these undesirable products from the phosphated asbestos fibers by flushing same in the second chamber by using air or any inert gas such as nitrogen. If desired any unreacted phosphating can be recycled if the amount is important.

It is also essential that the displacement of the phosphated asbestos fibers be countercurrently to the direction of the flushing gas or gases. Like the reaction chamber, the second chamber is equipped with tumbling means for insuring movement of the phosphated asbestos fibers from their entry point to their opposite exit point.

OPERATIONAL PARAMETERS

The implementation of the invention calls for the selection of several operational parameters that are related to the nature of the phosphating agent, the temperature of adsorption, the curing temperature and the duration of these different steps. They are summarized in Table II.

TABLE II

| Phosphating agent | OPERATIONAL PARAMETERS | | | | | |
|---|---|---|---|---|---|---|
| | Min. | Pref. | Max. | Min. | Pref. | Max. |
| | Temperature of adsorption (°C.) | | | Duration of adsorption (Hr) | | |
| $PCl_3$ | 75 | 100 | 150 | 0.5 | 1.0 | 3 |
| $POCl_3$ | 105 | 180 | 300 | 0.2 | 1.0 | 3 |
| $PCl_5$ | 160 | 180 | 250 | 1.0 | 4 | 8 |
| | Temperature of curing (°C.) | | | Duration of curing (Hr) | | |
| $PCl_3$ | 80 | 150 | 250 | 0.5 | 2.0 | 4 |
| $POCl_3$ | 110 | 230 | 350 | 0.1 | 1.0 | 5 |
| $PCl_5$ | 180 | 250 | 450 | 0.2 | 2.0 | 10 |

PARAMETERS OF ASBESTOS FIBERS

The physical preparation of a given asbestos fiber lot to be treated must be such as to allow a good circulation of the gases through the mass of fibers. Therefore, the mass of fibers must be in a loose form. The loose density of the fibers varies with the grades of fibers that have to be treated and must be adjusted to the proper value to facilitate the treatment. Table III gives a description of the typical loose density of fibers for the implementation of the invention. These loose densities can be obtained by the use of standard techniques familiar to those involved in asbestos technology.

TABLE III

LOOSE DENSITY OF ASBESTOS FIBERS

| GRADES (Quebec standard) | LOOSE DENSITY* kg/m³ | LOOSE DENSITY** AFTER OPENING kg/m³ |
| --- | --- | --- |
| 3 | 57 | — (1) |
| 4 | 125 | 37 |
| 5 | 153 | 54 |
| 6 | 191 | 73 |
| 7D | 200 | — (2) |
| 7 | 263 | — (2) |

(1) Very long fibers which are normally not subject to strong opening.
(2) Very short fibers which are not normally opened.
*Sampling in accordance with procedure A-1-74 of Chrysotile Asbestos Test Manual.
**Opening in accordance with procedure F-2-72 of Chrysotile Asbestos Test Manual.

PRESSURE OF PHOSPHATING AGENT

The partial pressure of phosphating agent in the stream of dry gas can vary over a large range. In principle, the convecting gas could be eliminated entirely and the vapors of the phosphating agent carried to the asbestos fibers directly. But, it has been found easier to control the operation of the process with the use of a carrier gas with a partial pressure of phosphating agent in the range of 0.1 to 0.9 atmosphere with 0.5 atmosphere being preferred. The use of pressure above atmospheric would also facilitate the diffusion of the phosphating agent through the bundles. But this approach would call for a much more complex equipment because of the toxic nature of the phosphating agents. Therefore, an operation near atmospheric pressure is preferred. It has been found that either chrysotile asbestos or amphiboles such as amosite or crocidolite could be phosphated by using the above technique. It is believed, without going into limitative considerations, that the substantial presence of magnesium, calcium and iron respectively in chrysotile, amosite and crocidolite allows the formation, at least in part, of phosphates of these metals. Such phosphates being very stable and of low solubility give a very resistant passivation of these fibers.

BRIEF DESCRIPTION OF THE DRAWING

FIG. 1 illustrates a circuit describing the process made in accordance with the present invention.

DESCRIPTION OF THE SEQUENCE OF REACTION

Referring to FIG. 1, the selected asbestos fibers to be treated stored in a tank 1 are admitted, through a rotary metering valve 2, to a first reaction chamber 3 in which intimate contact is achieved between the asbestos fibers and the phosphating agent.

The temperature of the treated material is controlled so as to be kept slightly above the boiling point of the phosphating agent. To achieve this, the asbestos fibers in storage tank 1 are preheated.

A stream of dry gas 4, such as air, saturated with the phosphating agent, is admitted in the reaction chamber 3 countercurrent to the circulation of the asbestos fibers thereby insuring contact with the fibers. This stream of dry gas is generated from a stock 5 of phosphating agent. A valve 6 controls a saturator 7 fed from the stock 5 thereby controlling the supply of the dry gas to the reaction chamber 3. The saturator 7 is kept at the appropriate temperature in order to load the carrier stream with the required amount of phosphating agent. The incoming stream 4 must be heated at a temperature slightly above the boiling point of the phosphating agent before being admitted to the chamber 3 where it is adsorbed on and partly reacted with asbestos. The stream of gas is previously dried in a dryer 8.

The gaseous outlet 9 of the reaction chamber 3 may contain unreacted phosphating agent along with hydrogen chloride. This material can be either scrubbed in a unit 10 and discarded or the scrubber unit can condense and recycle the phosphating agent with some bleeding (indicated by arrow 11) as is conventionally known in gas handling technology. The carrier gas released from the scrubber unit 10 is fed back to the dryer unit 8 along with fresh carrier gas received at 12.

The asbestos fibers, having adsorbed the phosphating agent, is then admitted through an airlock 13 to a second chamber 14 to be cured, preferably at a higher temperature than the temperature at which the phosphating reagent has been adsorbed on the fibers. As curing is achieved in chamber 14, a stream of gas 15 is passed through a metering and heating unit 16 to the chamber 14 to sweep the reacting mass in this chamber in such a way that, when phosphated asbestos fibers leave the system through an airlock 17, it is devoid of any residual fumes of either hydrogen chloride or phosphating agent. The air loaded with contaminants from chamber 14 is scrubbed at 18 to thereby release clean air at 19 to the atmosphere.

The treated asbestos from the airlock 17 is bagged at 20 to give a product 21 ready for use.

The present invention will be more readily understood by referring to the following examples which are given to illustrate rather than limit the scope of the invention.

EXAMPLE 1

A lot of 4.0 kg of BC4T asbestos fibers having a loose density of 125 kg/m³ was introduced in a phosphating reactor after being preheated to 180° C. in an oven. The reactor was also preheated to 180° C. It was made of a stainless steel cylinder 30 cm in diameter and 1.1 m in length and equipped internally with four vanes, 5 cm in height, running full length of the reactor and welded radially on the inside perimeter of the reactor. The reactor can be rotated at variable speed, up to 40 rpm and is provided with an intake and an outlet at opposite ends.

A stream of dry air was circulated through a saturator containing $POCl_3$ kept at 75° C. The resulting gas stream was preheated to 180° C. before being admitted to the axis of the rotating reactor through an articulated coupling. Under these conditions, the gas stream used contained 2.568 g/liter of $POCl_3$, corresponding to a partial pressure of $POCl_3$ of 0.37 atmosphere. The rate of admission of dry air to the saturator was 7.12 liters/minute as measured at 20° C. This rate was decreased to 1.65 liter/hour after one hour of reaction and maintained at that level for one more hour. The incoming gases were vented at the end of the reactor. The admission of $POCl_3$ was then stopped and the temperature raised to 230° C. for two additional hours while maintaining a stream of 20 liters/minute of air through the tumbling mass of asbestos in the reactor.

The phosphated asbestos fibers recovered were found to contain 1% by weight of phosphorus measured as $PO_4$.

EXAMPLE 2

The treatment was repeated as described in Example 1 except that the phosphating agent was PCl$_5$. The saturator was kept at 200° C. The first four hours of contact were at 200° C. and the curing of four hours at 250° C. The treated fibers contained 0.7% P.

EXAMPLE 3

The treatment was repeated as described in Example 1 except that the phosphating agent was PCl$_3$. The saturator was kept at 50° C. and the first contacting period of one hour was done at 125° C. The following curing was of two hours at 150° C. After the treatment, the fibers contained 0.8% P.

EXAMPLE 4

The treatment was repeated as in Example 1 except that the fiber used was amosite, grade S-11, having a loose density of 28 kg/m$^3$. After the treatment with POCl$_3$, the product contained 0.06% P.

EXAMPLE 5

Using crocidolite (grade WMS-8, loose density 80 kg/m$^3$), the treatment with POCl$_3$ was repeated as in Example 1. The treated fibers contained 1.1% P.

What is claimed is:

1. In a process for phosphating asbestos fibers by contacting asbestos fibers with a gaseous phosphorus chloride, the improvement which comprises,
   (a) countercurrently circulating in a closed system a gaseous phosphorus chloride in a first reaction chamber at near atmospheric pressure through a mass of substantially water-free asbestos fibers having a loose density between 15 and 325 kg/m$^3$,
   (b) adsorbing the gaseous phosphorus chloride on said asbestos fibers at a temperature in a range between the boiling temperature of the phosphorus chloride at atmospheric pressure and 200° C. above the boiling temperature of the phosphorus chloride for a period of time varying between 0.2 and 4 hours, whereby phosphated asbestos fibers are obtained,
   (c) curing while displacing said phosphated asbestos fibers in a second chamber for a period of from 0.1 to 6 hours at a temperature ranging from the boiling point of the phosphorus chloride and 240° C. above the boiling point of the phosphorus chloride, and
   (d) flushing the cured phosphated asbestos fibers to remove therefrom any unreacted phosphorus chloride, volatile and toxic by-products produced during the reaction of said asbestos fibers with the phosphorus chloride and recovering said cured phosphated fibers.

2. The process of claim 1, wherein the gaseous phosphorus chloride is circulated in the first reaction chamber by means of a stream of dry gas.

3. The process of claim 2, wherein the dry gas is dry air and the partial pressure of the phosphorus chloride is between 0.1 and 0.9 atmosphere and is preheated to the temperature of the first reaction chamber, and the air-phosphorus chloride mixture being admitted to said first reaction chamber at a pressure not in excess of 3 atmospheres absolute.

4. The process of claim 1, wherein the phosphorus chloride is selected from phosphorus trichloride, phosphorus oxychloride and phosphorus pentachloride.

5. The process of claim 1, wherein said displacement is accomplished by tumbling, the asbestos fibers countercurrently to the direction of the gas.

6. The process of claim 1, wherein the asbestos fiber is chrysotile asbestos fiber.

* * * * *